UNITED STATES PATENT OFFICE.

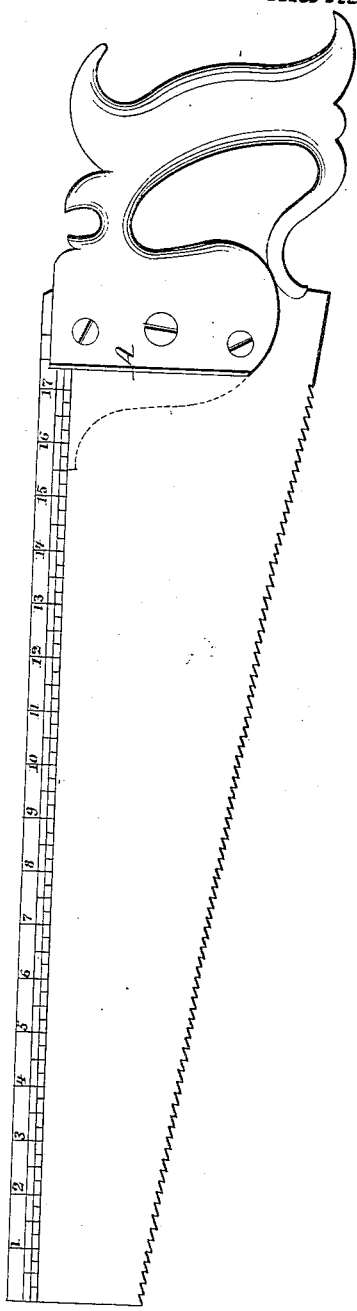

JACKSON GORHAM, OF BAIRDSTOWN, GEORGIA.

HANDSAW.

Specification of Letters Patent No. 14,863, dated May 13, 1856.

*To all whom it may concern:*

Be it known that I, JACKSON GORHAM, of Bairdstown, in the county of Oglethorpe and State of Georgia, have invented a new and useful Improvement in the Construction of Handsaws, whereby a saw is made to answer the purpose of a square as well as saw; and I do hereby declare that the following is a full and exact description thereof, reference being had to the accompanying drawings and to the letters of reference marked thereon.

The nature of my improvement consists in making the handle of a saw straight on the front part as seen at A instead of the usual form as represented by the dotted line, and placing said straight part at a right angle with the back of the saw which should also be straight. The straight part of the handle which is designed to be held against the article to be squared, may be faced with metal like a common try square, and the back of the saw may be graduated with inches and parts of inches.

What I claim as my invention and desire to secure by Letters Patent is—

The construction of a saw so as to answer the purposes of both saw and square in one and the same instrument, substantially as above described.

JACKSON GORHAM.

Witnesses:
GEO. W. NEAL,
THOMAS CALLAHAN.